Nov. 7, 1933.  L. BARBER  1,934,253
NUT CASTELLATING MACHINE
Filed May 8, 1930   2 Sheets-Sheet 1
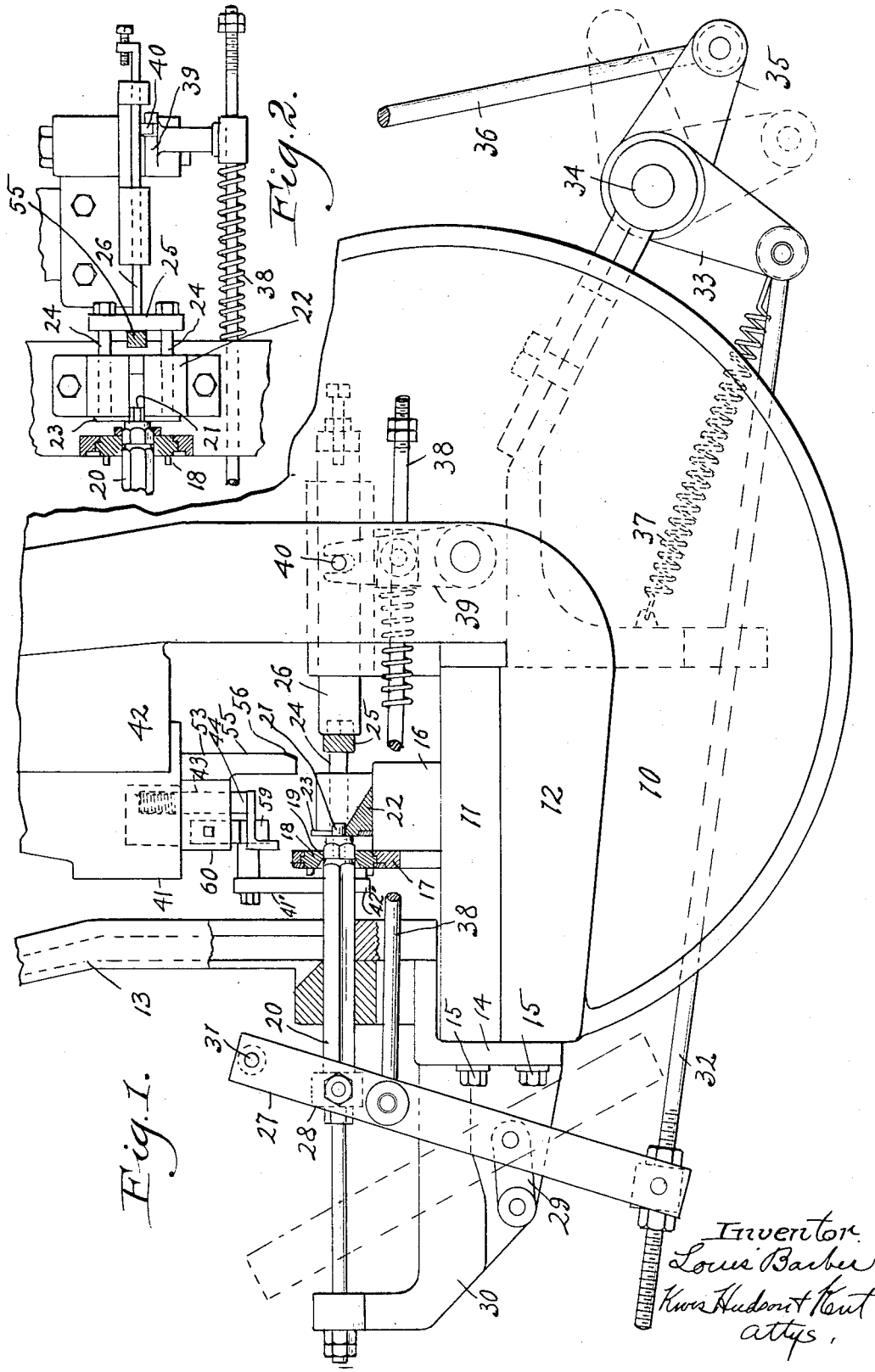

Nov. 7, 1933.   L. BARBER   1,934,253
NUT CASTELLATING MACHINE
Filed May 8, 1930   2 Sheets-Sheet 2

Inventor
Louis Barber
Kivas Hudson & Kent
attys.

Patented Nov. 7, 1933

1,934,253

UNITED STATES PATENT OFFICE 1,934,253

NUT CASTELLATING MACHINE

Louis Barber, Cleveland, Ohio, assignor to The National Screw & Manufacturing Company, Cleveland, Ohio, a corporation of Ohio Application May 8, 1930. Serial No. 450,624

4 Claims. (Cl. 10—72)

This invention relates to a nut castellating machine, and more particularly to a device associated therewith for coordinating the faces of the nut blank with the means for slotting the same.

In its more specific aspect the invention is a further improvement over the machine invented jointly by Emmett L. Filson and myself patented August 9, 1921, No. 1,387,092 and improved by my invention patented March 24, 1925, No. 1,530,974.

In the machine developed by the above inventions, as disclosed in said patents, the blank is fed from a magazine to a rotary work holder, and the bore of the blank receives a die. The castellations are formed by a punch cooperating with a slot in the die to punch metal from the blank inward. The rotary work holder is indexed to bring portions of the nut blank successively under the punch. The work holder opening is provided with clearance to take care of irregularities in blanks of the same stock size, and to facilitate insertion and ejection of the blanks.

This clearance results in lost motion between the indexing mechanism and the blank, which lost motion is taken up entirely by the first operation of the indexing mechanism after the first stroke of the punch. This effect is caused by the bur which is left on the inner side of each slot, which bur drags on the relatively stationary die. In consequence, the first slot is irregularly spaced with respect to the other slots, so that in use, this slot will not properly receive a cotter-pin.

Other types of castellating machines used commercially are subject to the same defects, and it is therefore an object of the present invention to provide a device adapted to be attached to, or built into, a nut castellating machine for centering a portion of the nut blank with the means for slotting the same.

In these prior machines, after a nut is castellated by the necessary number of strokes of the punch, the blank is removed from the holder and stripped from the die. The ejector mechanism provided for this purpose must be returned to inoperative position before the first stroke of the punch for slotting the next blank, and so remain during the later strokes. It is therefore a further object of the present invention to provide a means for insuring that the ejector mechanism will be returned to inoperative position, and will remain in such position during the strokes of the punch.

Other objects and features of novelty will be apparent as the following description proceeds, reference being had to the accompanying drawings, in which, Fig. 1 is an elevation, partly in section, of portions of a nut castellating machine, only so much of the structure thereof being shown as is necessary for an understanding of the present invention;

Fig. 2 is a top plan view of the major portion of the operating mechanism which is beneath the punch, the rotary indexing plate and the plate holder being shown in section;

Figure 3:
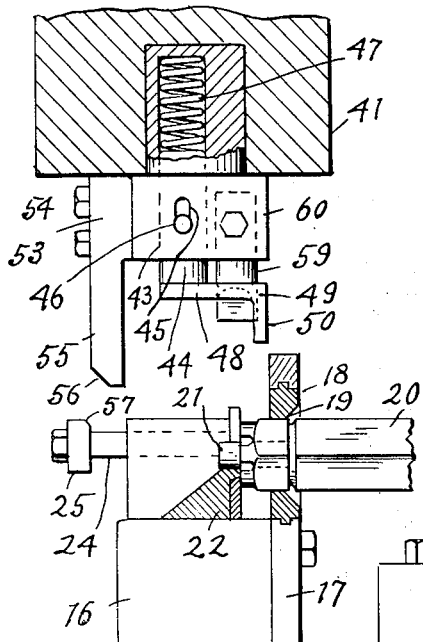
Fig. 3 is an enlarged detail view of the work holder and the punch, together with portions of the ejector mechanism, and showing the present invention as applied thereto, parts being shown in section.
Figure 4:
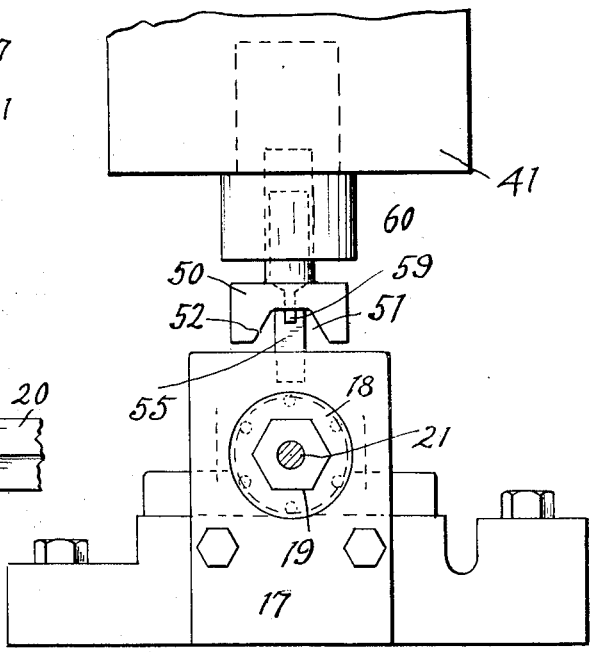
Fig. 4 is an elevation of the structure shown in Fig. 3.
Figure 5:
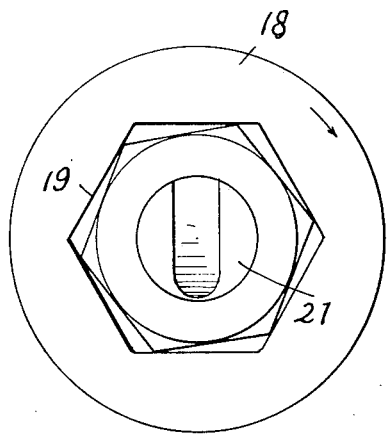
Fig. 5 is a still further enlarged, and also exaggerated view, showing the clearance between the work holder opening and the nut blank, as well as the improper position of the nut blank due to the conditions hereinbefore described.

Referring more particularly to the drawings, the major portion of the machine here shown is similar to those shown in the prior patents hereinbefore referred to, and therefore a brief description only is necessary. It will be sufficient to say that the improvement is applied to a punch press of standard form having a base or lower portion 10, which may be provided with a bolster plate 11 bolted to the base 12 of the machine.

A vertical magazine or chute 13 is secured to the front of the machine by a suitable bracket 14 preferably bolted to the base 12 and the bolster plate 11. The magazine 13 is provided with a slot into which the nut blank can be placed in any suitable manner, as by hand or automatically. The nuts 15 hold the bracket 14 in position, and cooperate with suitable means for permitting vertical adjustment of the magazine 13.

A block 16 is secured to the bolster plate 11 at the rear of the magazine 13 at the front of which block is suitably secured a holder 17 for a rotary indexing plate 18, at the center of which is an opening 19. The opening 19 is slightly larger than the stock size of nut blank to be castellated, but otherwise corresponds thereto in shape and size, so that the blank can be pushed into the far side of the opening in the manner hereinafter explained, and so that as the plate is indexed it will rotate the nut blank with it.

The blanks are fed one at a time from the magazine 13, and carried forwardly from the bottom of the magazine into the rotary holder 18 by a horizontal reciprocating carrier 20, the sectional outline of which is preferably the same as that of the blank to be castellated, and generally, though not necessarily, hexagonal. At the front end of the carrier is a die 21 adapted to be extended through the bore of the blank and to project slightly beyond the blank when the carrier is moved forwardly to advance the blank into the rotary work holder, this die, as explained in the prior patents, having a slot to accommodate the bottom of the punch.

When the carrier has been moved forward so as to position the blank in the work holder as shown in Fig. 1, the forward end of the die 21 rests on a stationary anvil 22, mounted on the block 16, this anvil being open at the top, or formed with a slot with an inclined bottom down along which the punchings may slide.

A knock-out device or ejector consisting of a piece 23, lying in front of the anvil 22, and carried at the forward end of a pair of guide rods 24, slidable through the anvil on opposite sides of the middle part which supports the front end of the die 21, and connected together by a rear cross piece 25, is designed to be moved forwardly at the completion of the series of strokes necessary to castellate the nut blank, to eject the blank from the work holder when the carrier 20 is moved back to pick up a new blank, this ejector being moved forwardly by a sliding bar 26, and being designed to move rearwardly to the position shown in Fig. 1 by the new blank as it is shifted from the magazine into the rotary work holder 18.

The carrier and ejector are operated by a lever 27, which may be actuated manually or automatically, as respectively provided by the prior patents hereinbefore referred to. The lever 27 is connected by a swivel block 28 to the carrier 20, and is connected by a pivoted link 29 to an extension 30 of the frame of the press, which extension may be part of the bracket 14. For manual operation, a handle (not shown) may be secured at the upper end of the lever by a bolt passing through the aperture 31. For automatic operation, the lower end of the lever 27 is pivotally connected to a rod 32, the other end of which is pivoted to one arm 33 of a rock shaft 34 having a suitable bearing secured to the press frame. The other arm 35 of the rock shaft is connected to a link 36, which is reciprocated once after each series of operations of the punch. A spring 37 is provided in the mechanism, and normally tends to hold the lever 27 in position in which the carrier is moved forward. In the automatic type shown, the spring 37 is connected to the arm 33 and secured to a stationary part of the press frame.

Also pivoted to the lever 27 adjacent the swivel block 28 is the forward end of a rod 38 which extends rearwardly to one side of the center plane of the press, and near its rear end is pivotally connected to a forked arm 39 notched at its upper end, with the notched part engaging a pin 40 carried by the slide 26 which moves the ejector forwardly.

The castellations are cut by a punch 59 adjustably secured in a holder 60 carried by a reciprocating head 41 mounted in a slide 42 carried by the upper portion of the press frame. Indexing mechanism indicated generally at 41', and actuated by the reciprocation of the press, cooperates with pin 42' mounted on the rotary carrier 18, and serves to rotate the nut blank through a desired angle for each operation of the press.

The structure described above is fully disclosed in the two prior patents hereinbefore referred to, and therefore forms no part of the present invention other than in combination with the structure now to be described.

Figure 6:
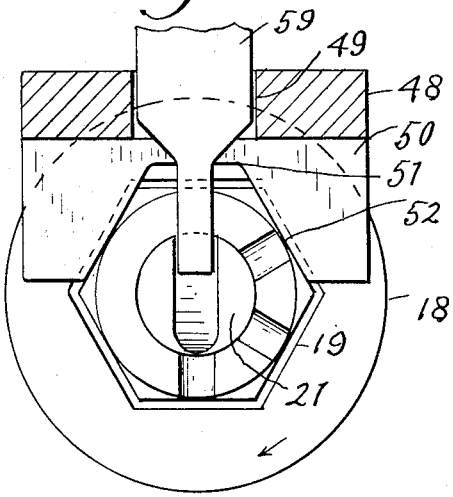
Fig. 6 is a view similar to Fig. 5, but showing the nut blank properly positioned by the operation of structure according to the present invention.

The punch holder 60 is provided with a bore 43 parallel to the bore for the punch 59, and the bore 43 slidably receives a pin 44. A pin 46 projects from the pin 44 through an elongated slot 45 in the holder 60. A compression spring 47 is inserted in the bore and bears against the inner end of the pin 44, so as to normally project the pin to the limit of the slot 45. The bottom of the pin 44 carries a foot or laterally projecting flange 48, provided with an aperture 49 adapted to fit and slide over the punch 59. The foot 48 terminates in a depending flange 50 which is notched as at 51, the side 52 of the notch being inclined, and the bottom of the slot being smaller than a face of the nut blank. Thus, as shown in Fig. 6, the inclined sides 52 will engage faces of the nut blank and will center the blank, as will be further described.

The punch holder 60 also carries a member 53, the body portion of which is secured thereto by bolts 54. A depending arm 55 extends below the holder 60 and terminates, below the level of the flange 50, in a cam 56. The arm 55 is arranged to clear the anvil 22, but to engage the cross bar 25 of the ejector mechanism, in the event that this bar is not fully returned to inoperative position. The upper portion of the bar 25 is preferably chamfered off as at 57, to provide a cooperating surface for the cam 56, so that in the event that the bar 25 has not been fully returned, the cam 56 engaging the surface 57 will smoothly force the bar 25 to the limit of its return movement.

The operation of the structure shown in Figs. 3, 4, 5 and 6 will now be described, the operation of the remaining portions of Figs. 1 and 2 being obvious from the foregoing description of the structure, and also fully disclosed in the prior patents hereinbefore referred to. Assuming that a nut blank is in the position shown in Figs. 3 and 4, and the holder 60 starts to descend to cut a slot in the blank, the cam surface 56 will first engage the cam surface 57 and urge the bar 25 to the limit of its travel to inoperative position. Further descent of the holder 60 will bring the notched lower end of the flange 50 into engagement with the faces of the nut blank which are adjacent to the face which is in line with the point to be slotted. Further movement of the punch holder 60 will cause the stem 44 to recede into the bore in the plunger, thus compressing the spring 47, relative movement being permitted by the elongated slot 45. Thus, the centering device will engage the nut blank with considerable pressure, before the punch 59 reaches the nut blank. Still further movement of the punch holder will cause the punch 59 to pass through the metal of the blank into the slot in the die 21. These operations are repeated with each operation of the punch, and as each portion of the blank is positively centered before engagement of the punch therewith, it is obvious that the castellations of the nut will be true, and that any oppositely disposed pair of slots will be properly aligned so that the same may receive a cotter pin when the castellated nut is put into its intended use.

While the invention has been described with particular reference to one particular type of nut castellating machine, it is obvious that the invention is equally applicable to other types of nut castellating machines which encounter similar problems. It is therefore to be understood that the present invention is not limited to only the specific type of nut castellating machine shown in the prior patents referred to. Furthermore, as to the invention per se, while one embodiment thereof has been illustrated and described in such detail as to enable any one skilled in the art to practice the invention, nevertheless the invention is not limited to the details disclosed other than as necessitated by the development of the prior art, but, instead, includes such embodiments of the broad idea as fall within the scope of the subjoined claims, it being obvious that various substitutions, alterations, and other desired changes may be resorted to without departing from the spirit of the invention.

Having thus described my invention, I claim:

1. In a nut castellating machine, a punch, a punch holder for said punch, a rotary work holder for receiving nut blanks, indexing mechanism for said work holder, means for operating said punch holder to cause said punch to slot a blank held by said work holder, and centering means carried by said punch holder and engageable with the blank in advance of said punch for centering said blank in said work holder.

2. In a nut castellating machine, a reciprocable slide, a punch holder having a stem operably connected with said slide, a punch carried by said punch holder, a work holder for nut blanks, and means carried by said punch holder adapted to engage a nut carried by said work holder to center the same with respect thereto, said means comprising a stem slidable in the stem of said punch holder and a member carried by said slidable stem having a depending flange provided with a notch adapted to engage faces of a nut.

3. In a nut castellating machine, a punch holder, a punch carried by said punch holder, a holder for nut blanks, and a guide slidably carried by said punch holder, said guide comprising a depending flange having a notch adapted to engage faces of a nut blank.

4. In a nut castellating machine, a reciprocable slide, a punch carried by said slide and having a plunger slidable therein, a work holder for nut blanks, means associated with said plunger for centering a face of a blank in said holder with respect to said punch, ejector mechanism for said holder, and means carried by said slide for returning said ejector mechanism to inoperative position when said punch is making a stroke.

LOUIS BARBER.